United States Patent [19]

Kimura et al.

[11] Patent Number: 5,546,593
[45] Date of Patent: Aug. 13, 1996

[54] MULTISTREAM INSTRUCTION PROCESSOR ABLE TO REDUCE INTERLOCKS BY HAVING A WAIT STATE FOR AN INSTRUCTION STREAM

[75] Inventors: Kozo Kimura, Osaka; Hiroaki Hirata, Kyoto, both of Japan

[73] Assignee: Matsushita Electric Industrial Co., Ltd., Osaka, Japan

[21] Appl. No.: 63,938

[22] Filed: May 17, 1993

[30] Foreign Application Priority Data

May 18, 1992 [JP] Japan .................................. 4-124910

[51] Int. Cl.$^6$ .............. G06F 9/24; G06F 9/38; G06F 9/30
[52] U.S. Cl. .................... 395/800; 395/375; 395/454
[58] Field of Search ........................ 395/800, DIG. 1, 395/375, 425, 700, 454; 364/200

[56] References Cited

U.S. PATENT DOCUMENTS

| | | | |
|---|---|---|---|
| 4,345,309 | 1/1980 | Arulpragasm et al. | 364/200 |
| 4,349,871 | 9/1982 | Lary | 364/200 |
| 4,392,200 | 6/1983 | Rulpragasam et al. | 364/200 |
| 4,926,323 | 5/1990 | Baror et al. | 364/200 |
| 4,967,338 | 10/1990 | Kiyahara et al. | 364/200 |
| 5,021,945 | 6/1991 | Morrison et al. | 364/200 |
| 5,127,092 | 6/1992 | Gupta et al. | 395/375 |
| 5,333,280 | 7/1994 | Ishikawa et al. | 395/375 |
| 5,404,469 | 4/1995 | Chung et al. | 395/375 |

OTHER PUBLICATIONS

Multithreaded Processor Architecture with Simultaneous Instruction Issuing, ISS '91: International Sumposium on Supercomputing, Nov. 1991.
Elementary Processor Architecture with Simultaneous Instruction Issuing from Multiple Threads, ISCA '92: 19th Annual Int'l Sumposium on Computer Architecture May 1992.
Elementary Processor Architecture with Parallel Instruction Issuing from Multiple Threads, Parallel Processing Symposium JSPP'92, Jun. 1992.
Elementary Processor Architecture with Parallel Instruction Issuing from Multiple Threads, Information Processing Report, vol. 34, No. 4, Apr. 1993.
Resource–Shared Processor Architecture with a Multiple Control–Flow Mechanism, Computer Architecture 92–2, Jun. 12, 1992.

(List continued on next page.)

Primary Examiner—Alyssa H. Bowler
Assistant Examiner—Krishna Malyala
Attorney, Agent, or Firm—Price, Gess & Ubell

[57] ABSTRACT

The present invention discloses a multistream instruction processor issuing instructions from N instruction streams in parallel, and processing instruction streams interchangeably when the number of the instruction streams is N or larger than N. Such processor comprises aninstructionpreparatio-nunit comprised of N thread slots each of which fetches/decodes instructions from the instruction stream assigned thereto as well as issues decoding result one at a time; a functional unit comprised of M instruction execution units each of which executes instructions in accordance with the decoding result of the thread slot; an execution connection unit for replacing a connection with another, the connection between the instruction preparation unit and the functional unit so that the result received from the thread slot will be provided to the execution unit which is ready to execute it; and an instruction stream controller comprised of a context backup memory and an exchange controller, the context backup memory holding a context of the instruction stream which indicates how far execution of the instruction stream had been conducted so that the instruction stream will be re-executed while the exchange controller extracting the context of the instruction stream and temporarily storing it into the context backup memory when a predetermined event happens in the instruction therefrom as well as making the instruction execution unit receive another instruction, the instruction execution unit which was executing the instruction including the predetermined event.

14 Claims, 12 Drawing Sheets

OTHER PUBLICATIONS

Peter Calingaert, "Operating System Elements a User Perspective" 1982 by Prentice–Hall, Inc. pp. 54–76.

Anthony Raltson et al., "Encyclopedia of Computer Science" Apr. 7, 1993, Van Nortano Reinhold pp. 910–911.

Max J. Schindler, "Microprocessor Software Design" 1986, Hayden.

Peter M. Kogge, "The Architecture of Pipelined Computers" Hemisphere Publing Corporation, 1982 pp. 237, 253.

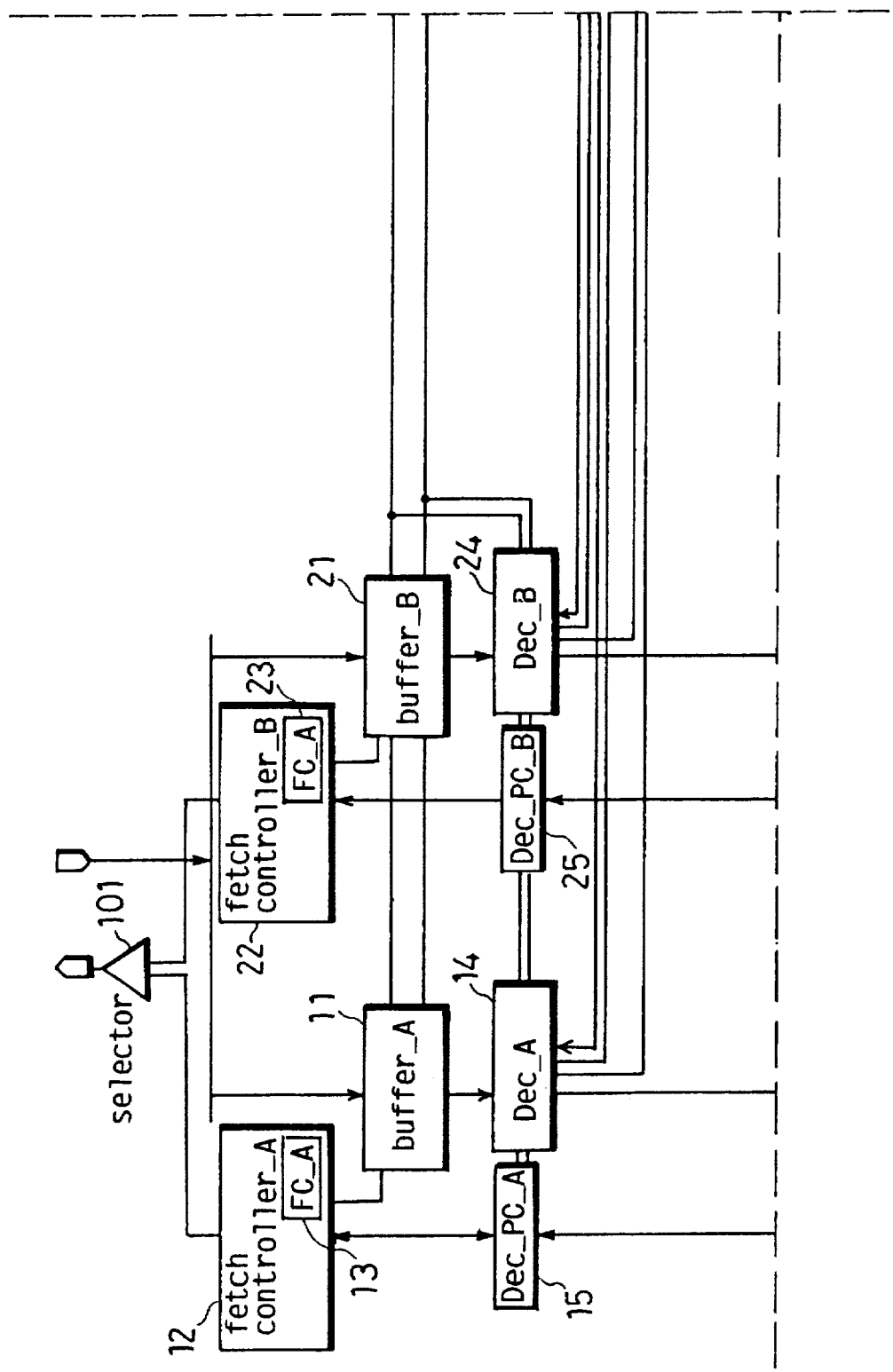

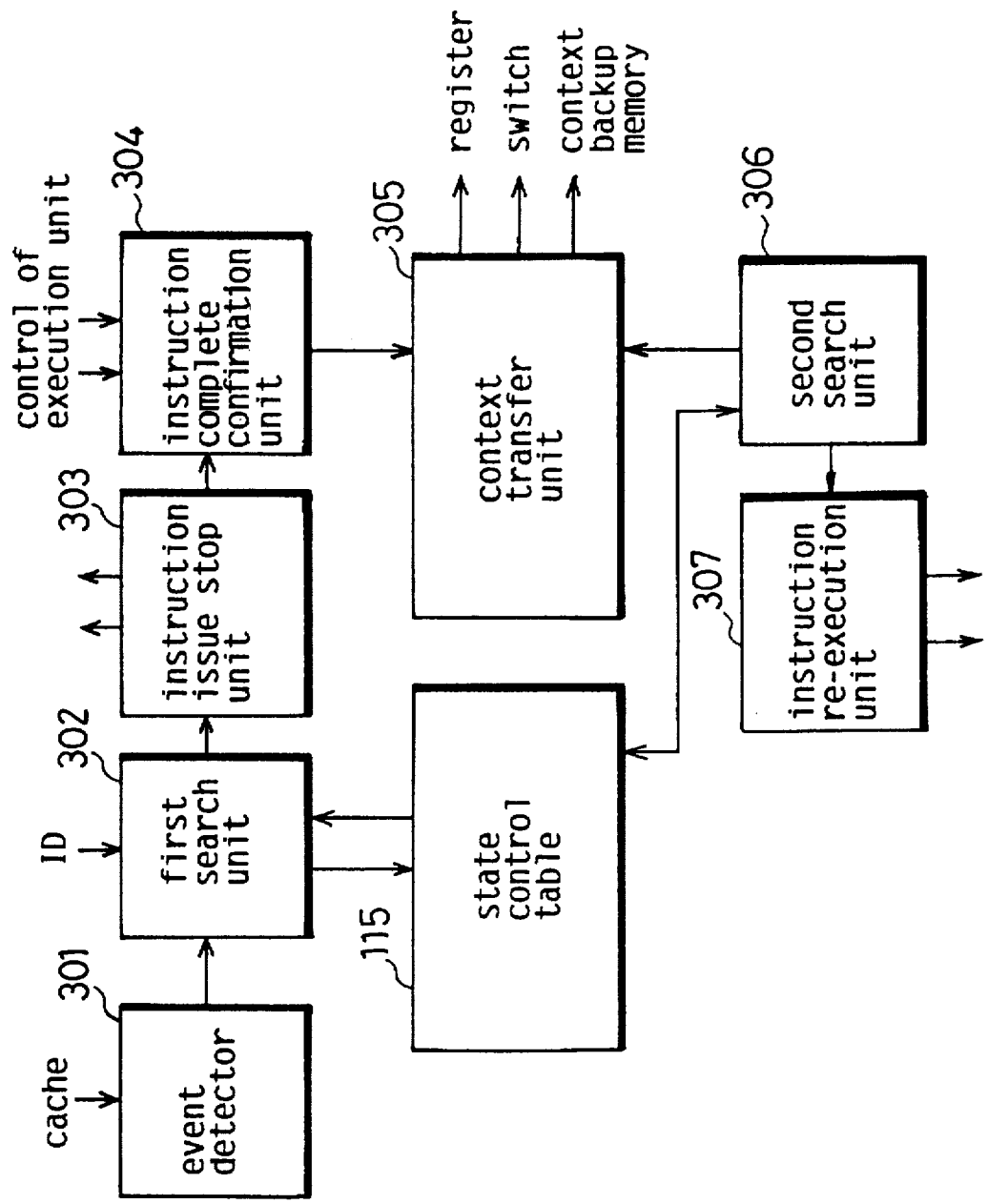

MULTISTREAM INSTRUCTION PROCESSOR ABLE TO REDUCE INTERLOCKS BY HAVING A WAIT STATE FOR AN INSTRUCTION STREAM

BACKGROUND OF THE INVENTION

(1) Field of the Invention

This invention relates to a multistream instruction processor for issuing instructions from multiple instruction streams to multiple functional units in parallel.

(2) Description of the Related Art

Conventionally, a multistream processor, called multi-thread processor, has been employed to process multiple instruction streams in parallel, which is fully described in "A multithreaded Processor Architecture with Simultaneous Instruction Issuing." In Proc. of ISS'91: International Symposium on Supercomputing, Fukuoka, Japan, pp. 87–96, November 1991.

Construction of the multithread processor will be described hereunder with reference to FIG. 1.

As apparent from the figure, the processor is provided with an instruction cache 200; several instruction fetch unit 201 and decode unit 202 pairs; standby stations 203; instruction schedule units 204; functional units 205; and a register set 206.

The instructions cache 200 stores instruction steams; the instruction fetch unit 201 extract instructions from the cache 200; the decode unit 202 decodes the instructions extracted by the corresponding instruction fetch unit 201; the standby station 203 holds instructions until they are selected by the instruction schedule unit 204; the instruction schedule unit 204 schedules the decoded instructions; the functional unit 205 executes the instructions in accordance with the schedule; and the register set 206 stores data to be executed as well as holds execution result.

Operation of the processor will be described in detail. Instructions of different instruction streams are extracted by the fetch unit 201, and they are decoded by the decode unit 202 in parallel, the decode unit corresponding to the fetch unit. The decoded instruction is scheduled by the instruction schedule unit 204 and delivered to the functional unit 205 unless an instruction decoded by another decode unit 202 competes for the same functional unit. Otherwise, the decoded instruction remains in the standby station 203 until it is selected by the instruction schedule unit 204. Then, the instruction is executed by the functional unit 205 which manipulates the register set 206.

Before the multithread processor, a superscalar processor issues and executes multiple instructions. Different from the multithread processor the superscalar processor comprises a single fetch unit and decode unit pair; therefore, it executes instructions from a single instruction stream in parallel. Also, frequent interlock of pipeline occurs since the instructions from a single stream are dependent on each other. Consequently, the multithread processor has been developed to execute instructions from multiple streams as well as to reduce interlocks. That is, in architecture of the multithread processor, an instruction from one thread is issued simultaneously with instructions from other threads. Instructions from multiple threads are independent from each other, and this improves throughput of the processor by improving efficiency of the functional units.

However, the conventional multithread processor does not overcome interlocks of the processor caused by so called a cache miss, which deteriorates efficiency of the processor.

For example, it is supposed that a cache miss is detected in execution of a LOAD instruction. At cache access where data is loaded from a main memory (not illustrated in the figure) into the register set 206 in accordance with the Load instruction, the functional unit (a load/store unit in this case) will be interlocked as the equivalent data is not found in the cache 200 (cache miss); and will remain interlocked until data in the cache 200 is updated. Subsequently, the decode unit assigned to the same instruction stream will freeze; and load instructions from other instruction streams cannot be issued thereto. Consequently, efficiency of the functional unit deteriorates, and finally the processor will freeze itself.

SUMMARY OF THE INVENTION

Accordingly, it is a primary object of the present invention to provide a multistream instruction processor for processing multiple instruction streams in parallel more effectively than the multithread processor by suppressing the interlocks as well as shortening the interlock period.

The above object may be fulfilled by a multistream instruction processor issuing instructions from N instruction streams in parallel, and processing instruction streams interchangeably when the number of the instruction streams is N and larger than N, the processor comprising an instruction preparation unit comprised of thread slots each of which fetches/decodes instructions from the instruction stream assigned thereto as well as issues decoding result one at a time, the number of the thread slots being N; a functional unit comprised of instruction execution units each of which executes instructions in accordance with the decoding result of the thread slot, the number of the instruction execution units being $M(M \geq N)$; an execution connection unit for replacing a connection with another, the connection between the instruction preparation unit and the functional unit so that the result received from the thread slot will be provided to the execution unit which is ready to execute it; and an instruction stream controller comprised of a context backup memory and an exchange controller, the context backup memory holding a context of the instruction stream which indicates how far execution of the instruction stream had been conducted so that the instruction stream will be re-executed, while the exchange controller extracting the context of the instruction stream and temporarily storing it into the context backup memory when 'a predetermined event happens in the instruction therefrom as well as making the instruction execution unit receive another instruction, the instruction execution unit which was just executing the instruction associated with the predetermined event.

The above object may be fulfilled also by a multistream instruction processor issuing instructions from N instruction streams in parallel, and processing instruction streams interchangeably when the number of the instruction streams is N and larger than N, the processor comprising an instruction preparation unit comprised of thread slots each of which fetches/decodes instructions from the instruction stream assigned thereto as well as issues decoding result one at a time, the number of the thread slots being N; a functional unit comprised of instruction execution units each of which executes instructions in accordance with the decoding result of the thread slot, the number of the instruction execution units being $M(M \geq N)$; a register unit comprised of register files, each of which includes a plurality of registers for holding data which will be employed in execution of instructions from the instruction stream to which the register file is assigned, the number of the register files being L ($L \geq N$); an execution connection unit for replacing a connection with another, the connection between the instruction preparation unit and the functional unit so that the result received from the thread slot will be provided to the execution unit which is ready to execute it; and an instruction stream controller comprised of an instruction stream control table, a context backup memory and an exchange controller, the instruction stream control table for holding assignment of the thread slot and the register file to one of the instruction streams, the context backup memory holding a context of the instruction stream which indicates how far execution of the instruction stream had been conducted so that the instruction stream will be re-executed, and the exchange controller extracting the context of the instruction stream and temporarily storing it into the context backup memory when a predetermined event happens in the instruction therefrom as well as making the instruction execution unit receive another instruction, the instruction execution unit which was executing the instruction including the predetermined event.

The followings are the bases for the above object to be achieved.

(1) When an instruction from an instruction stream is put into interlocked state, context of the instruction stream is transferred from the execution unit into memory; so that the execution unit starts processing instructions from other streams, preventing them from going into the interlocked state. Consequently, fewer interlocks will happen as well as interlock period will be shortened, which improve efficiency of the execution unit.

(2) Once an instruction stream is put into the interlocked state, the thread slot which had been assigned thereto will be employed to issue instructions from another instruction stream; therefore, efficiency of the processor will improve.

(3) One extra register file is preferably employed and it is assigned to the instruction stream even when it is in ready state. Consequently, as soon as it is put into execute state, instructions therefrom can be executed, without waiting for assignment of register file thereto. That is, time spent on evacuating the register file which had been assigned to the currently completed instruction stream will be saved.

(4) Owing to the extra register file, the instruction stream which has been currently processed may be replaced with another one easily. Also larger number of instruction streams will be processed in parallel.

(5) Context of the instruction stream is saved into the memory accommodated inside the processor, so that a high-speed exchange of instruction stream will be implemented. Also execution of an instruction requiring an external bus, such as a LOAD instruction, can be processed in parallel with execution of other instructions.

(6) Every memory access difficulty is processed as a cache miss; therefore, overhead of memory access will be reduced.

(7) Counting value provided from the decoder program counter into the thread slot includes only information related to the interlocked state caused by an event such as the cache miss; therefore, the exchange operation for replacing the instruction stream with another one as well as pipeline control will be handled easily.

(8) Context of the instruction stream informs the thread slot that how far the instruction stream had been executed before it was put into the interlocked state, so that it will easily detect the instruction to be re-executed.

(9) When a cache miss occurs, the processor completes instructions which have been issued from the same instruction stream as usual instead of stopping execution thereof and saving context of the instruction including the cache miss; which contributes to easy exchange of the instruction stream.

(10) Re-execution of the instruction starts from the execution unit. That is, the fetch unit and the decode unit, both of which integrate the thread slot, do not repeat the same operation they had completed before the interlocked state; therefore the exchange operation of the instruction stream will be conducted easily.

(11) Counting valued at the program counter related to the memory access instruction is saved as context of the instruction stream, therefore the exchange operation will be conducted easily.

(12) The memory access instruction is saved as context of a instruction stream when the instruction stream is put into the interlocked state; therefore a high-speed re-execution of the instruction will be implemented as well as the exchange operation will become easier.

BRIEF DESCRIPTION OF DRAWINGS

These and other objects, advantages and features of the invention will become apparent from the following description thereof taken in conjunction with the accompanying drawings which illustrate a specific embodiment of the invention. In the drawings:

FIGS. 2(a), 2(b), and 2(c) are block diagrams each showing partial construction of a processor in an embodiment of the present invention;

FIG. 3 is a block diagram showing construction of a pipe line controller in the embodiment;

DESCRIPTION OF THE PREFERRED EMBODIMENT

Figure 1:
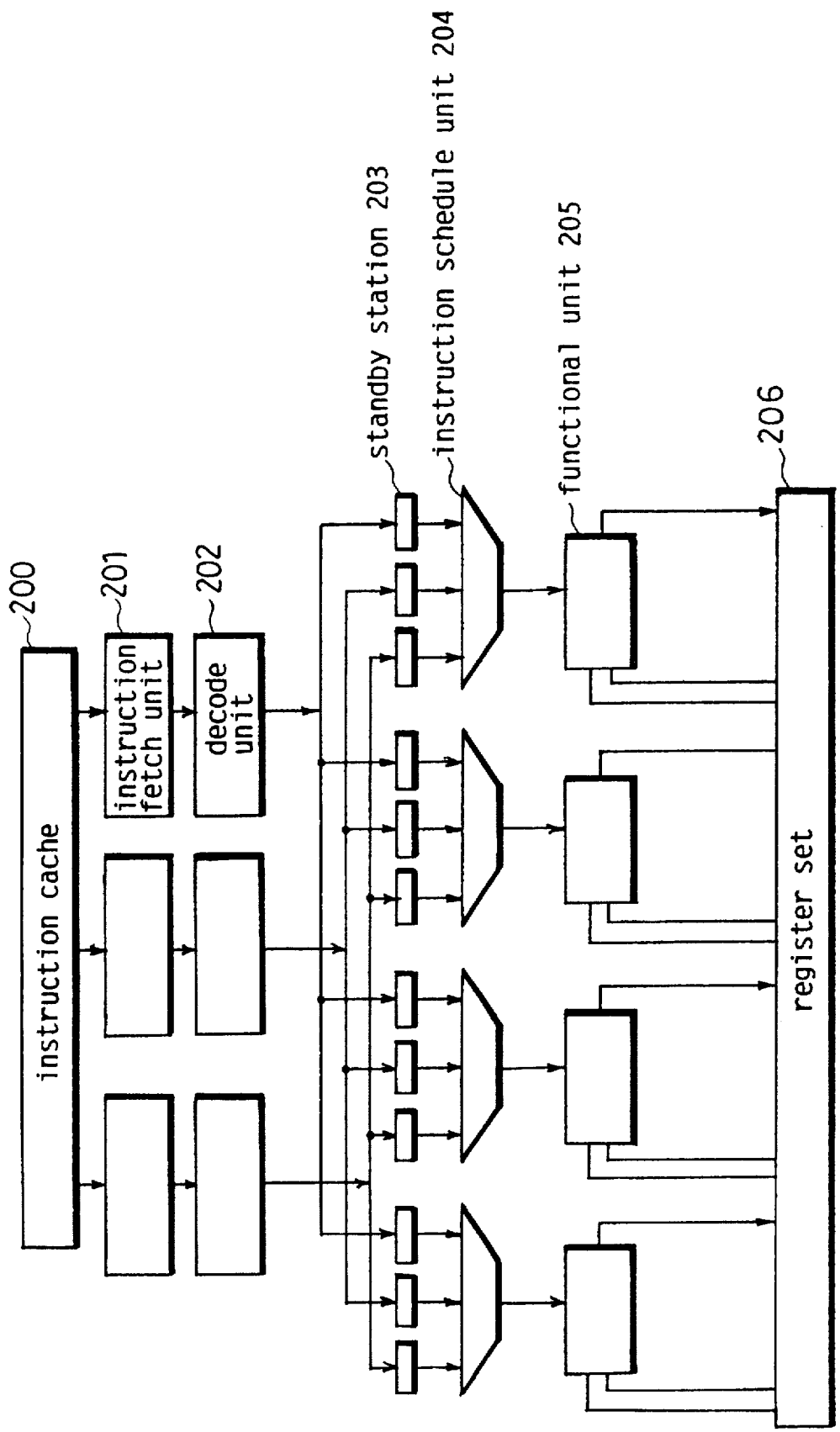
FIG. 1 shows construction of the conventional multi-thread processor.

Construction of a multistream instruction processor in the embodiment of the present invention will be described hereunder with reference to accompanying drawings.

FIG. 2 is divided into three fragmentary views (a), (b) and (c) in accordance with function of the processor. That is, (a) shows fetch of instructions up to decode thereof; (b) shows execution of instructions; and (c) shows control of a pipeline as well as a register file.

In FIG. 2(a) instruction buffers 11 and 21 hold instructions which were fetched from a cache memory, the cache memory holding instructions from multiple instruction streams.

Instruction fetch controllers 12 and 22 detect an address of an instruction to be fetched as well as controls an address of the instruction which is being decoded.

Instruction fetch counters 13 and 23 (hereinafter referred to as FC) hold address of the instruction to be fetched.

Decode units 14 and 24 decode instructions received from the instruction buffers 11 and 21 respectively.

Decode unit program counters (hereunder referred to as Dec_PCs) 15 and 25 hold address of the instruction which is being decoded by the decode units 14 and 24 respectively.

A selector 101 selects one of the addresses sent by the instruction fetch controllers 12 and 22 and outputs it.

Figure 2B:
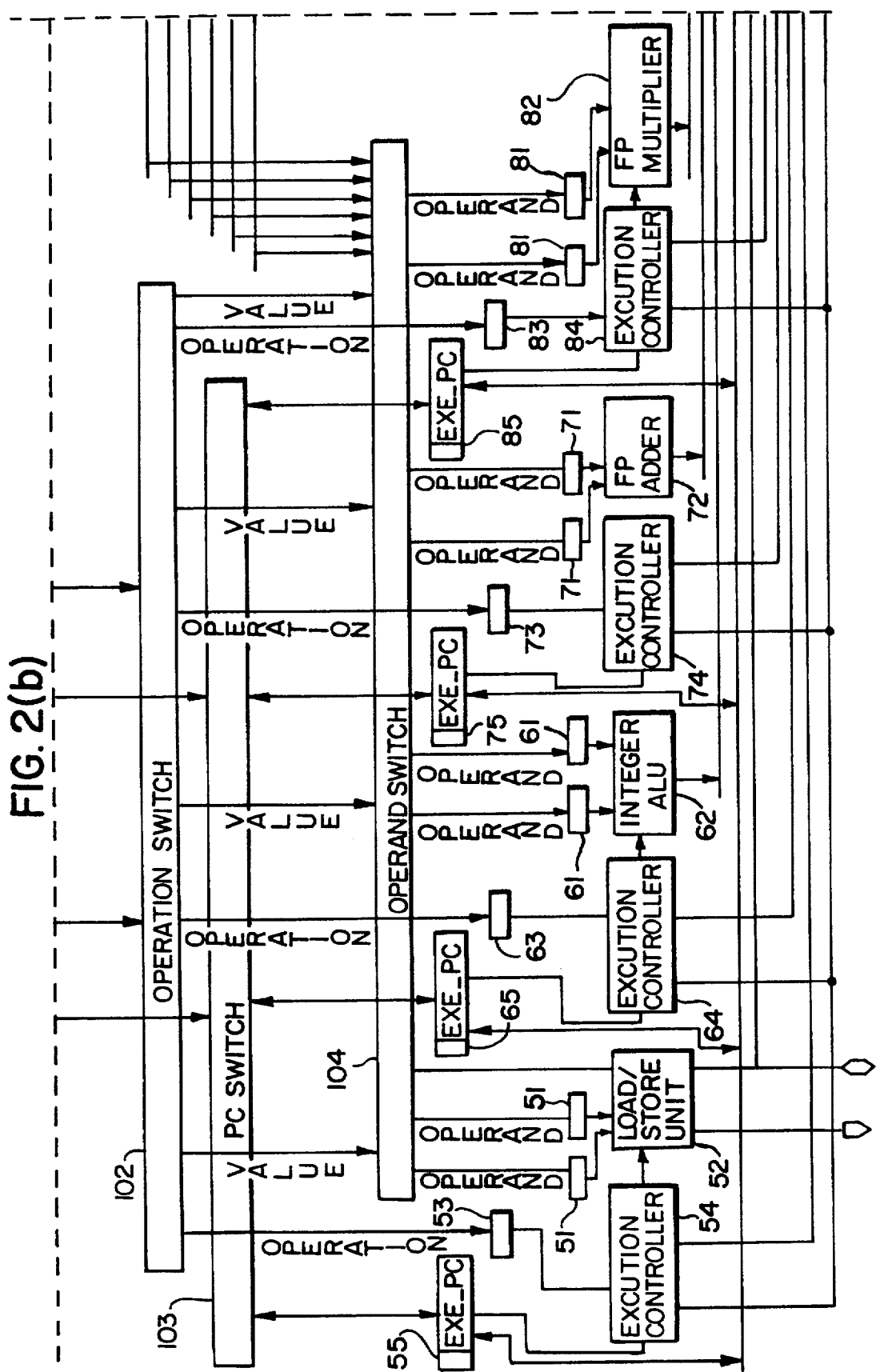

In FIG. 2(b) operand buffers 51, 61, 71, and 81 temporarily hold an operand which was read from a register in accordance with an operand field of the instruction.

Execution units 52, 62, 72, 82 are employed as a load/store unit, an integer arithmetic logic unit (integer ALU), a floating-point adder, and a floating-point multiplier respectively.

The load/store unit 52 executes a memory access instruction. The unit 52 is connected to the cache unit so that a high-speed access is implemented when data is found in the cache (referred to as a cache hit).

The integer ALU 62 executes an integer arithmetic logic instruction.

The floating-point adder 72 adds/subtracts floating-point numbers.

The floating-point multiplier 82 multiples/divides floating-point numbers.

As has been described, general functions are assigned to the execution units 52, 62, 72, and 82 for convenience of description; and functions other than the above can also be assigned thereto.

Operation buffers 53, 63, 73, and 83 temporarily hold the decoded instructions or operation codes decoded from the instructions by the decode units 14 and 24.

Execution controllers 54, 64, 74, and 84 control the execution units 52, 62, 72, and 82 in accordance with the operation code stored in the buffers 53, 63, 73, and 82 respectively.

Execution program counters 55, 65, 75, and 85 (hereinafter referred to as Exe_PCs) holds an address of the instruction being executed as well as an identification (ID) number of the instruction stream. The address and the ID number at the Exe_PCs 55, 65, 75, 85 correspond to the instructions being executed by the execution units 52, 62, 72, and 82 respectively.

An operation switch 102 switches one of the execution units so that the operation codes outputted from the decode units 14, 24 will be stored in one of the operation buffers 53, 63, 73, 83 depending on the sort of the operations code.

A program counter switch 103, associated with the operation switch 102, connects each of the Dec_PC_A 15, Dec_PC_B 25 with one of the Exe_PCs 55, 65, 75, 85 with reference to the kind of the decoded instruction.

An operand switch 104 switches so that the immediate data and the operand will be stored into the operand buffers 51, 61, 71, and 81, the data being received from the decode units 14 and 14 and the operand being received from the register files 107 108, 109.

Figure 2C:
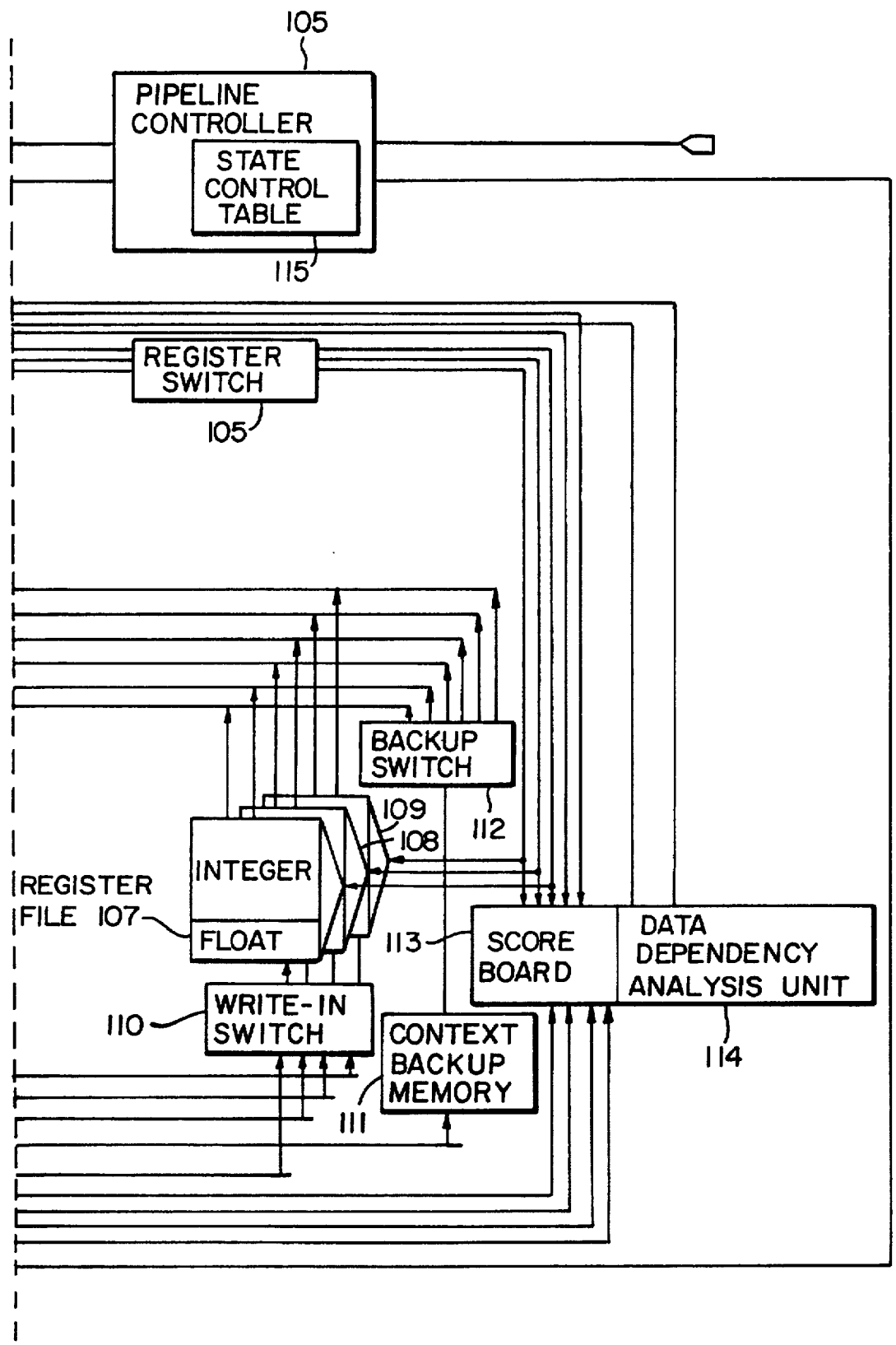

In FIG. 2(c) a pipeline controller 105 transfers a context as well as replaces the current instruction stream with another one.

A register switch 106 selects a register file assigned to the instruction stream; then outputs a register number thereof.

Register files 107, 108, and 109 have a plurality of integer registers and floating-point registers. Instruction streams in execute state or in ready state are dynamically assigned to one of the register files.

A register write-in switch 110 connects an output terminal of the execution units 52, 62, 72, 82 to a register of the register file which is assigned to the instruction stream; thereby, execution result will be written into the register.

A context backup memory 111 holds a context of the instruction stream. The context provides information required in replacement of the instruction stream which is currently processed with another one. The context of the instruction stream is loaded from/loaded in the memory 111 when exchange of the instruction stream occurs. As apparent from FIG. 7 the context in the memory 111 comprises:

(1) registers of the register file assigned to the instruction stream;

(2) data read from the Dec_PC assigned to the instruction stream comprising the address of the instruction which is being executed as well as the ID number of the instruction stream;

(3) operation code of the instruction being executed, which has been stored in the operation buffer; or operation code of the instruction to be stored into the operation buffer when the instruction is re-executed;

(4) counting information related to the instruction being executed (including the ID number of the instruction stream), which is at the Exe_PC 55; or counting information related to the instruction to be re-executed (including the ID number of the instruction stream), which will be at the Exe_PC 55 when the instruction is re-executed); and (5) memory address specified by the operand of the instruction being executed; or memory address specified by the operand of the instruction to be re-executed.

A backup switch 112 connects the register files 107, 108, 109 to the context backup memory 111 so that data in the memory 111 is transferred to the register file and vice versa.

A scoreboard 113 shows a register number of a destination register reserved for the instruction being executed.

A data dependency analysis unit 114 checks for a data dependency with reference to the scoreboard 113 and a destination register for an instruction being decoded.

A state control table 115 provides information as to an instruction stream: a state thereof, a register file it is assigned to, and a fetch unit it is assigned to. The fetch unit is comprised of an instruction controller, instruction buffer, and FC set. The information at the table 115 is referred to as well as updated by the pipeline controller 105.

Construction of the pipeline controller 105 will be described with reference to FIG. 3.

An event detector 301 detects that the data to execute the load/store instruction is not found in the cache as well as data in the cache is updated.

When a cache miss is detected by the detector 301, a first search unit 302 figures out the instruction stream from which the load/store instruction comes as well as figures out the fetch unit assigned thereto. The unit 302 further figures out the execution unit which executes the instruction; however, this is omitted in this embodiment since each execution unit is designed to have unique function, such as the load/store function assigned to the load/store unit 52. To be precise as for this embodiment; when a cache miss is detected in a LOAD instruction, the first search unit 302 figures out the instruction stream including the LOAD instruction with reference to the ID number received from the execution controller 54. Then the unit 302 figures out the fetch unit to which the instruction stream is assigned.

An instruction issue stop unit 303 terminates operation of the fetch unit detected by the unit 302 as well as operation of the decode unit corresponding to the fetch unit, so that no succeeding instruction will be fetched, decoded, nor issued. At the same time the pipeline controller 105 controls the load/store unit 52 to pretend that it has completed the LOAD instruction.

An instruction complete confirmation unit 304 confirms that all instructions which have been issued to the execution units are completed, the instructions from the same instruction stream detected by the first search unit 302. To be concrete, the instruction complete confirmation unit 304 compares the ID number of the instruction stream including the LOAD instruction to the ID number of the instruction stream which is being executed, the former instruction stream detected by the first search unit while the latter instruction stream identified from its ID number currently received from the execution controllers 54, 64, 74, 84. If they are consistent with each other, meaning that there still are incomplete instructions; the unit 304 waits for completion of the instructions; then confirms complete of the instruction stream.

Figure 5:
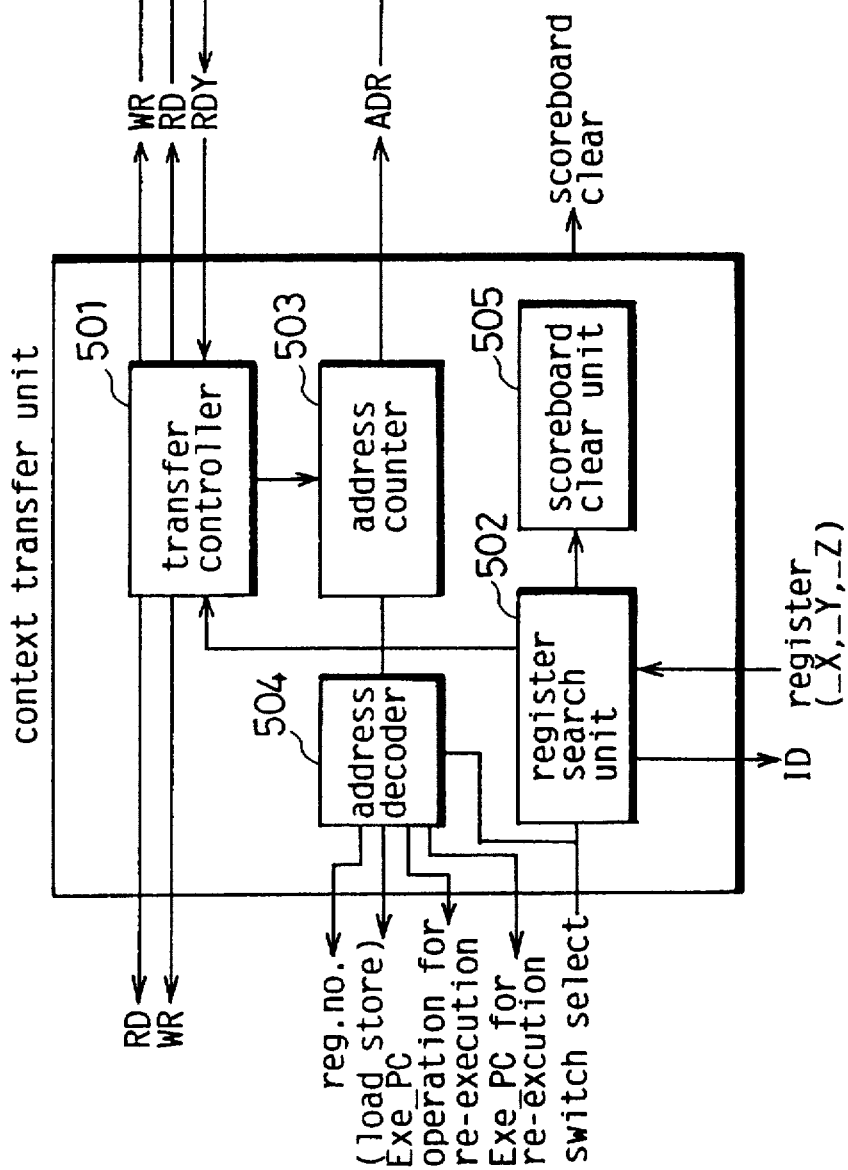
FIG. 5 is a block diagram showing construction of a context transfer unit in the embodiment.

A context transfer unit 305 stores context of the instruction stream detected by the first search unit into the context backup memory 111 as well as forwards state of an instruction stream from ready state into execute state with reference to the memory 111. Detailed construction of the unit 305 will be described later with reference to FIG. 5.

A second search unit 306 finds an instruction stream in ready state, and assigns the fetch unit and decode unit pair thereto, the pair which was terminated by the unit 303. Further the unit 306 starts the context transfer unit 305 so that context of the instruction stream in ready state will be loaded from the context backup memory 111.

A re-execution unit 307 starts operation of the fetch unit and decode unit pair, the pair detected by the unit 306, as well as starts operation of the load/store unit 52.

Figure 4:
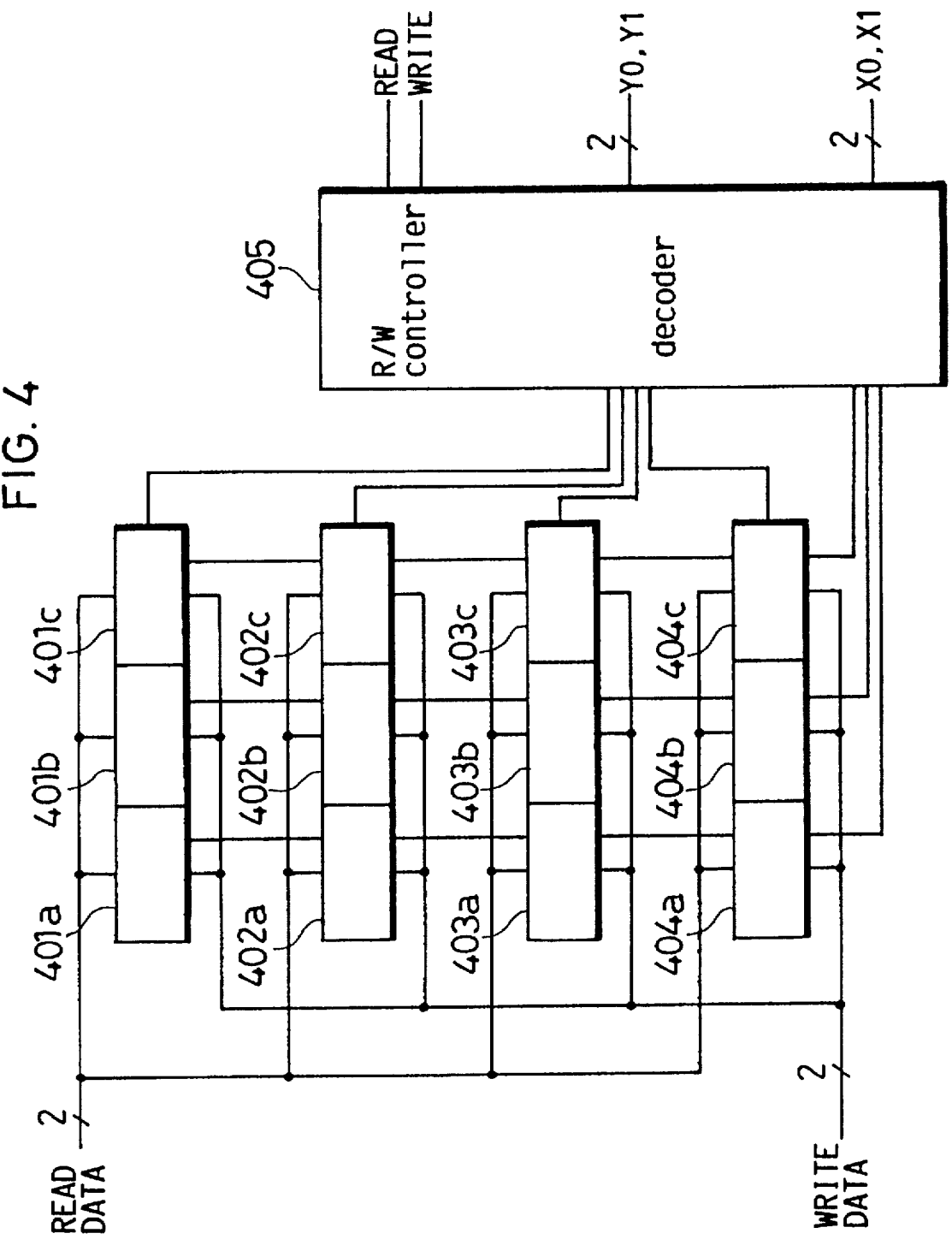
FIG. 4 is a block diagram showing construction of a state control table in the embodiment.

Construction of a state control table 115 will be described in detail hereunder with reference to FIG. 4. Two-bit data related to the instruction streams is written in/read from one of table cells 401a through 401c, 402a through 402c, 403a through 403c and 404a through 404c.

A table controller 405 controls data access to each table cell. Each cell has its own address, and the cell to accessed is selected by the controller 405. That is a Y address (Y0, Y1) is decoded by a decoder accommodated inside the controller 405 so that one of rows 401, 402, 403, 404 is selected. Also an X address (X0, X1) is decoded thereby to select one of columns a, b, c. Thus, a cell placed in the decoded row as well as in the column will be selected. The Y address is related to ID number of the instruction stream while the X address is related to state of the instruction stream, register file #, and the fetch unit #. Detailed construction of the context transfer unit 305 will be described hereunder with reference to FIG. 5.

In the figure a transfer controller 501 controls transfer of a context.

A register search unit 502 figures out the register file which stores the context.

An address counter 503 outputs counting value so that destination and source of the context will be determined.

An address decoder 504 decodes the counting value into control signals so that destination of data in the context backup memory will be selected.

A scoreboard clear unit 505 clears a part of the scoreboard corresponding to a register file when the context is loaded thereinto.

Figure 6:
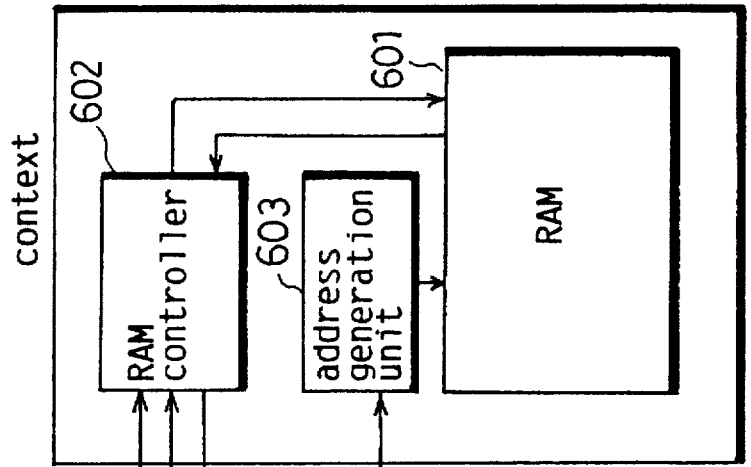
FIG. 6 is a block diagram showing construction of a context back memory in the embodiment.

Detailed construction of the context backup memory 111 will be described hereunder with reference to FIG. 6.

Figure 7:
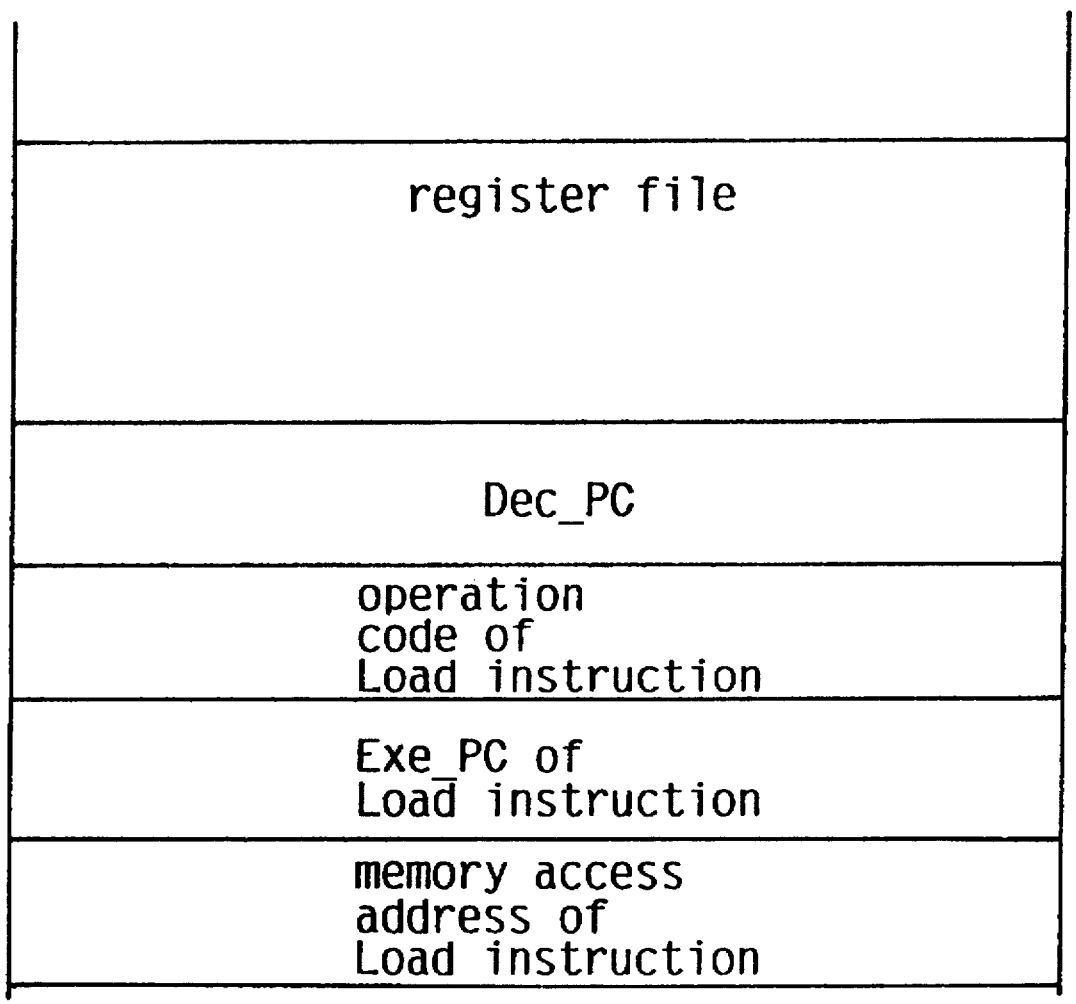
FIG. 7 shows content of the context backup memory in the embodiment.

Random access memory (RAM) 601 holds context of an instruction stream, the context which is shown in FIG. 7.

A RAM controller 602 controls read/write operation.

An address generation unit 603 generates addresses of data stored in the RAM 601 in accordance with the counting value received from the address counter 503.

As is apparent from the above construction, the processor comprises multiple fetch unit, buffer, decode unit sets; so that multiple instruction streams can be processed in parallel. Also each instruction stream is assigned to each set. Components assigned to the same instruction stream are distinguished from others by their titles. To be concrete with reference to FIG. 2(a), the fetch controller 12, the buffer 11, and the decode unit 14 are assigned to a single instruction stream; so that they are referred to as the fetch controller_A 12, the buffer_A 11, and the Dec_A 14 respectively. Further, the FC 13 inside the unit_A 12 and the Dec_PC 15 associated with the Dec_A 13 are referred to as the FC_A 13 and the Dec_PC_A 15 respectively. Similarly, the fetch controller_B 22, the buffer_B 21, FC_B 23, the Dec_B 24, and the PC_B 25 are assigned to a single instruction stream. Also as shown in FIG. 2(c), the register files 107, 108, 109 assigned to separate instruction streams are referred to as the register file_X 107, the register file_Y 108, and the register file_Z 109 respectively.

Construction of the processor has been described so far; operation thereof will be described next with reference to accompanying figures.

In the operation hereunder it is assumed that four instruction streams are operated by the processor; and they are referred to as instruction stream 1, instruction stream 2, instruction stream 3, and instruction stream 4. Each of the instruction streams may form an independent program, or they may form one program together. For example, when a program is applied to four image data, the image data are processed by the instruction streams 1-4 in one-to-one manner.

As apparent from FIG. 2(a) and (c), the processor is provided with two fetch unit and decode unit pairs; and three register files. In this construction, two of the instruction streams are fetched and decoded in parallel.

Also as apparent from FIG. 2(b), the processor is provided with four execution units which operate independently and concurrently. Each of the execution units performs a unique function, so that instructions from different instruction streams (not a single stream) are delivered to the execution unit depending on the kind thereof. Consequently, instructions from a single instruction stream are executed by multiple execution units simultaneously, though they are decoded by a single decode unit one at a time. The execution units are pipelined; however, construction thereof will not be described herein since it is hardly related to what is disclosed in the present invention.

In the processor private hardware resource (fetch unit, register file, etc.) is assigned to each instruction stream being executed, and instructions from multiple streams are issued simultaneously. An example of the assignment is shown in Table 1.

TABLE 1

|  | state | register file | fetch unit |
| --- | --- | --- | --- |
| stream 1 | 00(execute) | 00(X) | 00(A) |
| stream 2 | 00(execute) | 01(Y) | 10(B) |
| stream 3 | 01(ready) | 10(Z) | 00(none) |
| stream 4 | 01(ready) | 11(memory) | 00(none) |

Table 1 indicates state of the instructions streams 1 through 4 as well as names a register file and a fetch unit which are uniquely assigned thereto. The cells in the state control table in FIG. 4 corresponds to the cells in Table 1. To be precise, rows of the state control table, referred to as 401, 402, 403, 404 correspond to the instruction streams 1 through 4; while columns of the state control table, referred to as a, b, c, correspond to the state of instruction stream, the register file, and the fetch unit respectively. Therefore, each cell in Table 1 is filled with two-bit data stored in the corresponding cell of the state control table.

States of an instruction stream will be described. The instruction stream stays in one of three states: execute state, wait state, and ready state. In execute state, a fetch unit and decode unit pair is assigned to the instruction stream and instructions issued from the decode unit are being executed by execution units. In wait state, a cache miss occurs so that the instruction stream waits for update of the cache. In ready state, data in the cache has been updated, although no fetch unit and decode unit pair has been assigned to the instruction stream.

Figure 8:
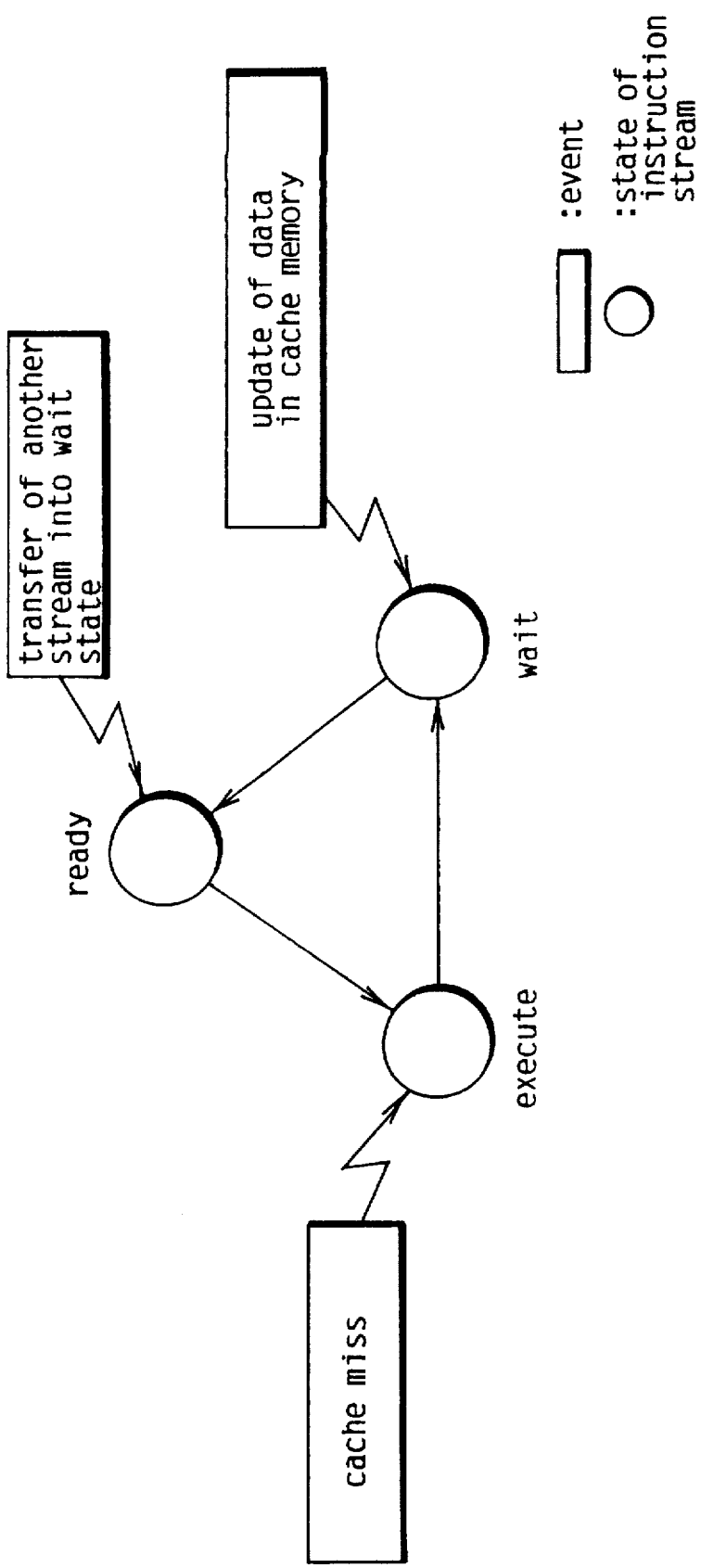
FIG. 8 shows a relationship between a state of the instruction stream and an event which causes transition in the state.

As shown in FIG. 8, state of the instruction stream transits upon an event. That is, when a cache miss occurs in execution of a LOAD instruction, the state of instruction stream changes from execute state into wait state. When data in the cache memory is updated, the state thereof is put into ready state. A fetch unit and decode unit pair is uniquely assigned to an instruction stream; therefore, the instruction stream in ready state will not be executed until another stream changes its state from execute state into wait state so that the fetch unit and decode unit pair which had been assigned thereto becomes available for the instruction stream in ready state. When the fetch unit and the decode unit pair is assigned to the instruction stream, the state thereof transits from ready state into execute state.

State transition of the instruction streams 1 through 4 will be described hereunder. It is assumed that Table 1 is current state of the processor. According to the table, the instruction streams 1 and 2 are in execute state while the instruction streams 3 and 4 are in ready state. A register file_X 107 and a fetch unit_A are assigned to the instruction stream 1; while a register file_Y 108 and a fetch unit_B are assigned to the instruction stream 2.

That is, instructions from the instruction stream 1 are fetched by the fetch unit_A 12 (including the instruction buffer_A 11 and the fetch controller_A 12), decoded by the decode unit_A 14 (including the Dec_PC_A 13), and executed by the execution units. An instruction from the stream 1 is delivered to the execution unit depending on the kind of the instruction. All execution units employ the register file_X 107 when they execute instructions from the instruction stream 1. Similarly, instructions from the instruction stream 2 are fetched by the fetch unit_B 22 (including the instruction buffer_B 21 and the fetch controller_B 22), decoded by the decode unit_B 24 (including the Dec_PC_B 23), and executed by the execution units which employ the register file_Y 108.

No fetch unit and decode unit pair has been assigned to the instruction streams 3 and 4 which are in ready state. However a register file is assigned to either of the streams 3 and 4 since three register files are available for instruction streams, and the register file_Z 109 is assigned to the instruction stream 3 herein.

The processor at the current state executes instructions from the instruction streams 1 and 2 in parallel. The instructions are delivered to the execution unit depending on the kind of the instruction, and an execution unit to which no instruction is given is put into idle state. With reference to the scoreboard 113, the execution result is stored into the destination register of the register file assigned to the instruction stream. As for the stream 4, no register file has been assigned thereto, and the context thereof has been stored in the context backup memory 111.

(No exchange of instruction stream)

It is assumed that cache accesses are all hit (referred to as a regular state), and operation of the processor in this case will be described hereunder.

Instructions from the instruction stream 1 are fetched by the fetch unit_A 12 and are stored in the instruction buffer_A 11, while instructions from the instruction stream 2 are fetched by the fetch unit_B 22 and are stored in the instruction buffer_B 21. The fetch unit_A 12 and the fetch unit_B 22 keep the processor pipeline supplied with instructions. That is, operating independently from other units such as the decode unit, the fetch units keep the buffer_A 11 and the buffer_B 21 filled with the instructions without an interruption.

Address of the instruction to be fetched is stored in the fetch counters FC_A 13 and FC_B 23. Then, the FC_A 13 and FC_B 23 calculate destination of the fetched instruction by operating increment and the like. The instruction address outputted by the FC_A 13 and the FC_B 23 is sent to the cache via the selector 103 interchangeably. When a branch instruction is applied, the fetch units also fetch an instruction diverged from the branch instruction; however execution of branch instruction will be omitted therein since it is hardly related to the present invention.

The instructions stored in the buffer_A 11 and the buffer_B 21 are delivered to decode units, the Dec_A 14 and the Dec_B 24 respectively. Concurrently addresses of the instructions are provided by the FC_A 13 and the FC_B 23 to the Dec_PC_A 15 and the Dec_PC_B 25 respectively, and are stored therein, together with the ID numbers of the instruction streams 1 and 2.

For convenience of description, it is assumed that a load instruction (from main memory to registers) will be decoded by the Dec_A 14 while an ADD instruction (ADD of integers) will be decoded by the Dec_B 24.

Decoding operation code of the instruction, the Dec_A 14 and the Dec_B 24 determine destination of the decoded instruction. At the same time, the decoder units Dec_A 14 and Dec_B 24 examine a result of the data dependency analysis unit 114.

Detailed operation of the data dependency analysis unit 114 will be described. Check is conducted with reference to the scoreboard 113 which holds a register number of the destination register for the instruction being executed. That is, the register numbers at the scoreboard are recorded by the Dec_A 14 and the Dec_B 24 when issuing instructions to the execution units; erased by the executions controller 54, 64, 74, 84 when the instructions are completed. Subsequently, the unit 114 controls not to employ the destination register of the incomplete instruction in execution of a succeeding instruction by checking whether or not the register number of the decoded instruction has been erased from the scoreboard. Thorough description of the data dependency analysis will be referred to "An Extended Superscalar Processor Prototype Based on the SIMP (Simple Instruction Stream/Multiple Instruction Pipelining) Architecture, Interdisciplinary Graduate School of Engineering Sciences, Kyushu University, Shingaku Giho, CPSY-90-6.54, July 1990".

Instructions are issued from the Dec_A 14 and Dec_B 24 when no data dependency is detected; otherwise, no instructions will be issued therefrom.

Decoding operand of the instruction, the Dec_A 14 and the Dec_B 24 request a register file to provide data from the register designated by the operand. Request to the register file is conducted via the register switch 106. To be concrete, the Dec_A 14 outputs a register number to the register file_X 107; and the Dec_B 24 requests a register number to the register file_Y 108. Concurrently, the decode units output the instruction addresses at the Dec_PC_A 15 and the Dec_PC_B 25 to execution units via the PC switch 103.

Referring to the state control table 115 (Table 1), the register switch 106 connects the Dec_A 14 to the register file_X 107; and connects the Dec_B 24 to the register file_Y 108. Referring to an operation code of the decoded instruction, the operation switch 102 connects the Dec_A 14 and the Dec_B 24 to the execution units. Similarly, the PC switch 103 connects the Dec_PC_A 15 and the Dec_PC_B 25 to the Exe_PC 55 and the Exe_PC 65 respectively. Since the LOAD instruction and the ADD instruction have been decoded; the decode units, the decode unit PCs and the register files, all of which have been assigned to the instruction streams 1 and 2, are connected to the load/store unit 52 and the integer ALU 62 respectively.

In this connection, the operand which has been stored in the register file_X 107 is transferred to the operand buffer 51 connected to the load/store unit 52; while the operand in the register file_Y 108 is transferred to the operand buffer 62 connected to the integer ALU 62. Also the operation code decoded by the Dec_A 14 and the operation code decoded by the Dec_B 24 are stored into the operation buffer 53 and 63 respectively. Information at the Dec_PC_A 15 and information at the Dec_PC_25 are transferred to the Exe_PC 55 and the Exe_PC_65 respectively, the former information comprising address of the LOAD instruction and the ID number of the instruction stream 1 while the latter information comprising address of the integer ALU instruction and the ID number of the instruction stream 2.

The instructions are executed by the units 52 and 62, and the results are stored in the registers as well as in the memory. That is, the load/store unit 52 loads data from the cache memory; then stores it into the register of the register file_X 107. Since the cache access is a hit, the data is loaded at high speed. Concurrently, the integer ALU 62 stores the operation result into the register of the register file_Y 108. Further the execution controllers 54 and 64 control the register write-in switch 110 so that the execution units 52 and 62 are connected to the register files_X 107 and _Y 108 respectively.

Once the execution results are stored into the register files_X 107 and _Y 108, the execution controllers 54 and 64 erases the corresponding register from the scoreboard. Also at complete of the instruction, the Exe_PCs employed in the execution are put into idle sate until succeeding instructions are provided thereto.

When a couple of instructions compete for the same execution unit, the processor requires a unit for scheduling them. In this embodiment, it is assumed that no competition occurs; therefore, the unit will not described herein.
(exchange of instruction stream)

Hereunder operation of the processor including an exchange of instruction stream caused by a cache miss will be described with reference to accompanying figures.

The operation herein will be substantially same as the operation at the regular state except that the instruction currently processed is replaced with another stream whenever a cache miss occurs in a LOAD instruction; and the exchange operation will be described hereunder.

It is assumed that a cache miss occurs in the LOAD instruction from the instruction stream 1. When the data is not found in the cache memory, the load/store unit 52 is put into an interlocked state until data are transferred from the main memory to the cache memory so that data therein is updated. The instruction stream 1 is put into wait state, and another stream is put into execute state since the hardware resource which had been assigned to the stream 1 becomes available. The instruction stream 1 will be put into ready state once the data in the cache memory is updated; and will be returned into execute state when hardware resource becomes available for the stream 1 again.

Operation of the processor along with the exchange operation will be described hereunder. For convenience, it is assumed that cache miss previously occurred in the LOAD instruction from instruction streams 3 and 4; therefore they are not in execute state currently.

(1) The register file_X 107 and the register file_Y 108 have been assigned to the instruction streams 1 and 2 respectively. Instructions from the streams 1 and 2, both of which are currently in execute state, are executed.

(2) A cache miss occurs when the load store unit 52 executes the LOAD instruction from the instruction stream 1.

Figure 9:
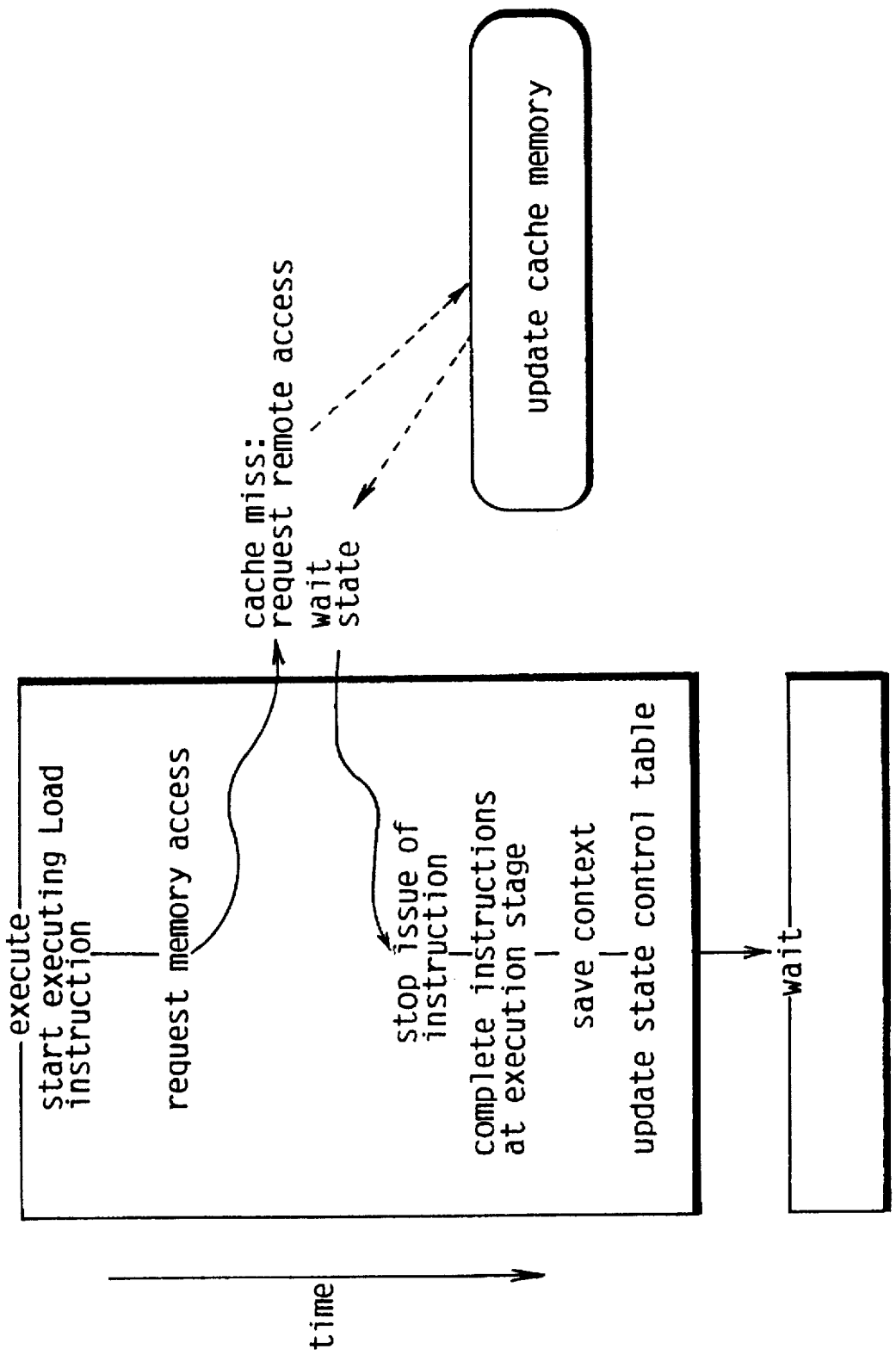
FIG. 9 is an illustration showing transition in the state of the instruction stream in the embodiment, from execute state into wait state.

(3) Context of the stream 1 is saved into the context backup memory 111, and the stream 1 is put into wait state. (stream 1: execute sate→wait state) The operations (1)–(3) are illustrated in FIG. 9.

(4) Preparation for re-execution of the stream 3 is conducted, such as providing context of the stream 3 to the FC. The stream 3 is in ready state and context thereof has been stored in the register file_Z 109.

Figure 10:
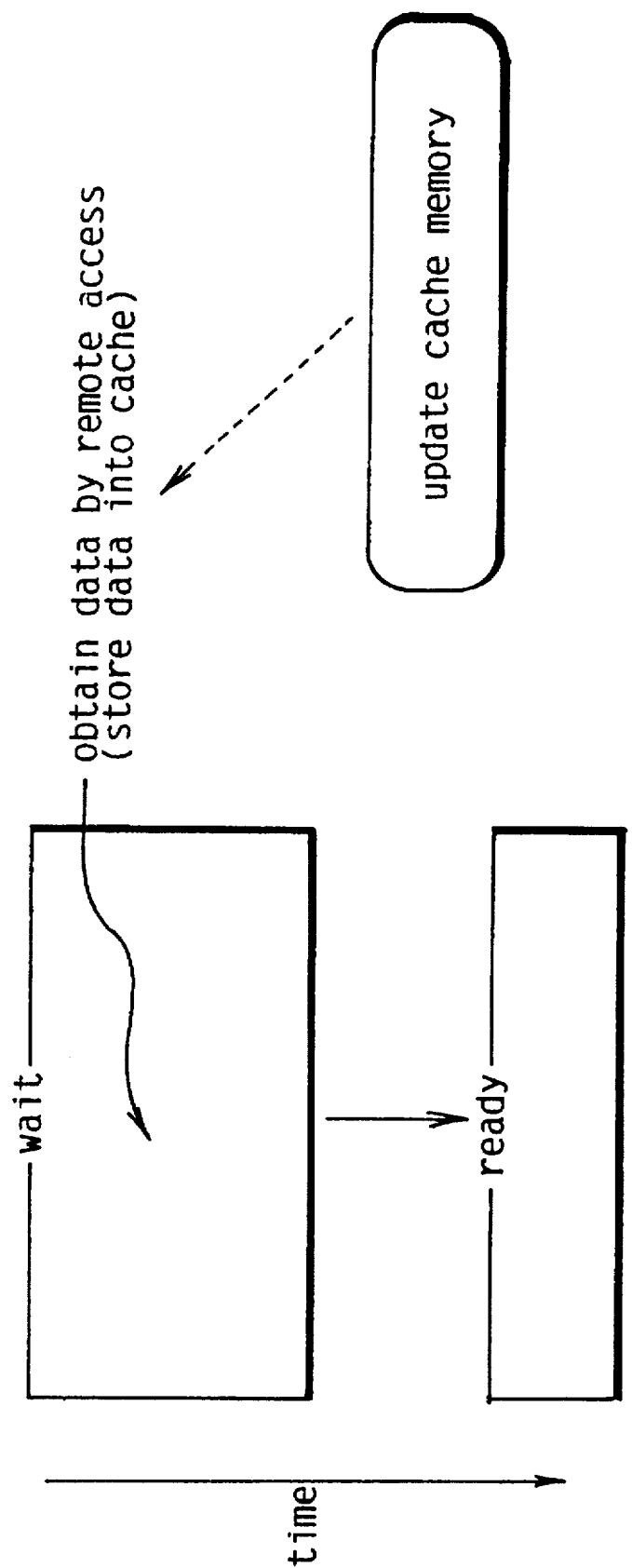
FIG. 10 is an illustration showing transition in the state of the instruction stream in the embodiment, from ready state into execute state.

(5) Re-execution of the stream 3 starts. (stream 3: ready state→execute state) The operations (3)–(5) are illustrated in FIG. 10.

(6) Since instruction stream 4 has been in ready state, context thereof is transferred from the context backup memory 111 into the register file_X 107.

Figure 11:
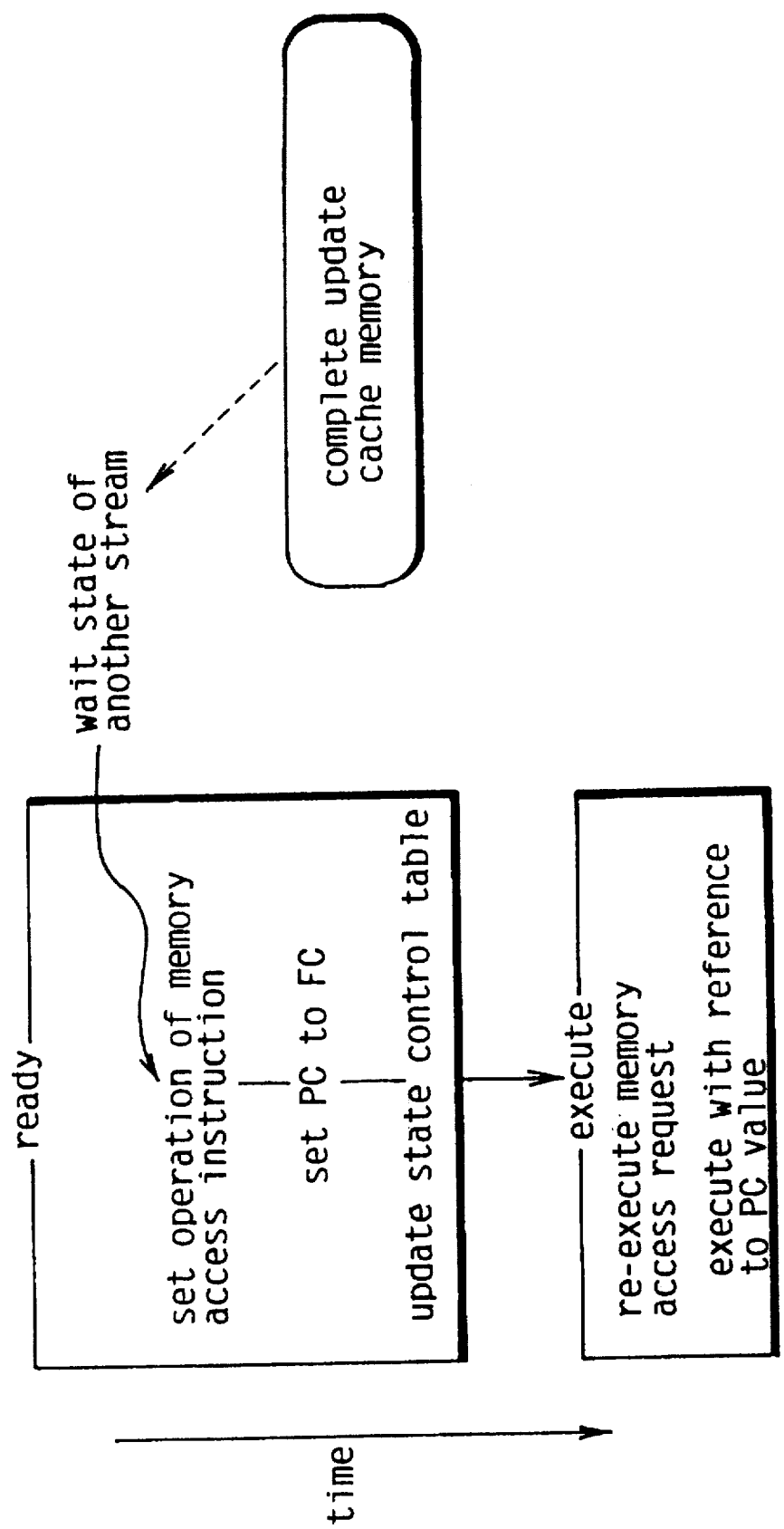
FIG. 11 is an illustration showing transition in the state of the instruction stream in the embodiment, from wait state into ready state.

(7) The data in the cache memory is updated. (stream 1: wait state→ready state) The operations (6) and (7) are illustrated in FIG. 11.

The operations (1) through (7) will be described in detail hereunder.

(1-1) Operations at the regular state, up to the cache access, are conducted. The current state of the processor is described in Table 1.

(2-1) A cache miss occurs in the LOAD instruction executed by the load/store unit 52. The pipeline controller 105 is informed that the cache miss has occurred.

(2-2) The cache miss is detected by the event detector 301 accommodated inside the pipeline controller 105. Receiving ID number of the instruction stream from the execution controller 54 associated with the load/store unit 52, the first search unit 302 identifies the instruction stream as well as the fetch unit and decode unit pair assigned thereto with reference to the state control table 115. To be concrete with reference to FIG. 4, the first search unit 302 inputs the Y address of "01" and the X address of "10" to the table control unit 405, the Y address specifying row of the instruction stream 1 while the X address specifying column of fetch unit. It is found that the cell 401c is selected by the unit 302, so that data in 401c will be outputted. Referring to data "01" outputted from the unit 401c, the first search unit 302 detects that the cache miss occurred in the LOAD instruction from the instruction stream 1 issued by the Dec_A 14.

(2-3) Receiving the result, the instruction issue stop unit 303 terminates the fetch unit and decode unit pair so that a succeeding instruction will not be issued, the pair including and supplied with the Dec_A 14, the buffer_A 11, the fetch unit_A 12, and the dec_PC_A 15.

(2-4) When the instruction issue stop unit 303 operates, the instruction complete confirmation unit 304 accommodated inside the pipeline controller 105 makes the load/ store unit 52 stop execution of the load/store instruction, though the result will not be written until the LOAD instruction is actually completed.

(2-5) Based on the signals received from the execution controllers 64, 74, and 84; the confirmation unit 304 figures out operation state of execution units other than the load/store unit. Then, the unit 304 confirms that every instruction which has been issued from the instruction stream 1 to the execution units are completed.

(3-1) The confirmation unit 304 directs the context transfer unit 305 to save context of the instruction stream 1 into the context backup memory 111. Construction of the context backup memory 111 has been described in the above, and will not be repeated herein.

Save of the context into the memory 111 by the context transfer unit 305 will be described. That is, data is read from the destination comprising the register file and the like; and is written into the context backup memory 111.

To be precise, the address decoder 504 inside the unit 305 decodes counting value provided by the address counter 503 so that a select signal representing source of the data will be determined. The source comprises [1] registers of the register file [2] Dec_PC [3] operation buffer [4] Exe_PC [5] address register inside the load store unit 52 (memory access address locating data in the cache memory). Also a switch select signal is sent to the register switch 106 so that the register search unit 502 figures out the register file assigned to the instruction stream 1. Further the address generation unit 603 decodes the counting value so that destination of the data inside the RAM 601 of the context backup memory 111 will be determined in accordance with the above source.

The transfer of data is controlled by the transfer controller 501. That is, directing the address counter 503 to output the counting value, the transfer controller 501 outputs a read control signal informing the source that data therein will be read as well as outputs a write control signal informing the destination that data will be written therein. Receiving a ready signal from the RAM controller 602 inside the context backup memory 111, the controller 501 controls the address counter 503 to output succeeding counting value. Repeating such operation, the controller 501 controls the transfer of all data from the source into the context backup memory 111.

(3-2) When the context of instruction stream 1 has been loaded into the memory 111, the scoreboard clear unit 505 clears a part of the scoreboard, the part related to the register file X assigned to the instruction stream 1.

(3-3) The second search unit 306 transits state of the instruction stream from execute state into wait state, and clears assignment of the register file_X 107 thereto. To be concrete, operation substantially same as (2-2) is conducted so that the cell representing the register file of the instruction stream 1 is filled with two-bit data, "11". Table 2 illustrates state of the processor when the instruction stream 1 is put into wait state.

TABLE 2

|  | state | register file | fetch unit |
| --- | --- | --- | --- |
| stream 1 | 00(wait) | 11(memory) | 01(A) |
| stream 2 | 00(execute) | 01(Y) | 10(B) |
| stream 3 | 01(ready) | 10(Z) | 00(none) |
| stream 4 | 01(ready) | 11(memory) | 00(none) |

(4-1) Referring to the state control table 115, the second search unit 306 figures out an instruction stream to be executed next. That is, the unit 306 detects that the instruction stream 1 is in wait sate; and the stream 3 will be executed next since it is in ready state and a register file has been assigned thereto.

Further the unit 306 starts the context transfer unit so that context of the instruction stream 3 will be loaded from the context backup memory 111 into destination comprising [2] through [5] assigned to the stream 3.

The load of the context is directed by the instruction complete confirmation unit 304. That is, directed by the unit 304, the context transfer unit 305 reads data from the context backup memory 111 as well as writes it into the destination [2]through [5].

To be precise, the context transfer unit 305 loads instruction address at the Dec_PC assigned to the instruction stream 3 as well as the ID number of the stream 3 from the context backup memory 111 into the FC_A 13 and the Dec_PC_A 15 respectively. That is the instruction address is loaded into the FC while only the ID number is loaded into the PC; thereby the instruction represented by the received instruction address will be fetched and fetched instruction will be issued as well as executed by the units corresponding to the FC. Consequently, amount of the context loaded will be reduced compared to the case when both the instruction address and the ID number are loaded into the Dec_PC 15.

(4-2) Further, operation code of the LOAD instruction [3], instruction address at the Exe_PC [4], and a memory access address locating data in the memory [5] will be loaded into the operation buffer 53, Exe_PC 55, and the address register inside the load/store unit 52 respectively.

Load of the context of the stream 3 by the context transfer unit 305 will be described. That is, data is read from the context backup memory 111; and is written into the destination comprising [2] through [5].

The address counter 503 inside the unit 305 outputs counting value related to the stream 3. The address decoder 504 decodes the counting value so that a select signal representing source of data will be determined. The source comprises an ID number stored in the Dec_PC as well as in the FC [2], operation buffer [3], Exe_PC [4], and address register inside the load/store unit 52 [5]. Also a switch select signal is sent to the register switch 106 so that the register search unit 502 figures out the register file assigned to the instruction stream 3. Further the address generation unit 603 decodes the counting value so that destination of the data inside the RAM of the context backup memory 111 will be determined in accordance with the above source.

The transfer of data is controlled by the transfer controller 501. That is, directing the address counter 503 to output the counting value, the transfer controller 501 outputs a read control signal informing the source that data therein will be read as well as outputs a write control signal informing the destination that data will be written therein. Receiving a ready signal from the RAM controller 602 inside the context backup memory 111, the controller 501 controls the address counter 503 to output succeeding counting value. Repeating such operation, the controller 501 controls the transfer of all data from the source into the context backup memory 111.

(5-1) The second search unit 306 transits state of the instruction stream 3 from ready state into execute state. That is, substantially same as (2-2), the cell representing state of the stream 3 is filled with two-bit data, "00". Table 3 illustrates state of the processor when the stream 3 is put into execute state.

TABLE 3

|  | state | register file | fetch unit |
|---|---|---|---|
| stream 1 | 10(wait) | 11(memory) | 00(none) |
| stream 2 | 00(execute) | 01(Y) | 10(B) |
| stream 3 | 00(execute) | 10(Z) | 01(A) |
| stream 4 | 01(ready) | 11(memory) | 00(none) |

(5-2) Informed by the second search unit 306 that the stream has been put into the execute state, the re-execution unit directs the execution controller 54 inside the load/store unit 52 to execute the instruction. Thus, the LOAD instruction from the stream 3 is re-executed based on the operation code in the operation buffer 53 as well as data in the cache memory located by the memory access address.

(5-3) Further the re-execution unit 307 directs the fetch unit_A 12 to fetch instructions indicated by the FC_A 13.

(5-4) The fetched instructions are stored into the buffer_A 12, and are decoded by the Dec_A 14. The decoded instructions are processed by the processor which follows the operations at regular state.

(6-1) Detecting that the register file 107, which had been assigned to the instruction 1, is available, and the instruction stream is in ready state; the second search unit 306 loads context of the stream 4 from the memory 111 into the register file_X 107. That is, context of the stream 4 is transferred from the context backup memory 111 into the register file_X 107. The transfer of the context is substantially same as (3-1) except that only the context [1]of the memory 111 will be loaded into the register file. In this case the address counter 503 outputs the counting value related to the context [1].

(6-2) At completion of the transfer, the second search unit updates the state control table 115, as is described in Table 4.

TABLE 4

|  | state | register file | fetch unit |
|---|---|---|---|
| stream 1 | 10(wait) | 11(memory) | 00(none) |
| stream 2 | 00(execute) | 01(Y) | 10(B) |
| stream 3 | 00(execute) | 10(Z) | 01(A) |
| stream 4 | 01(ready) | 00(X) | 00(none) |

(7-1) Data in the cache memory is updated.

(7-2) The event detector 301 inside the pipeline controller 105 detects that data has been updated. The first search unit 302 updates the state control table 115 so that state of the instruction stream 1 will transit from wait state into ready state, as shown in Table 5.

TABLE 5

|  | state | register file | fetch unit |
|---|---|---|---|
| stream 1 | 01(ready) | 11(memory) | 00(none) |
| stream 2 | 00(execute) | 01(Y) | 10(B) |
| stream 3 | 00(execute) | 10(Z) | 01(A) |
| stream 4 | 01(ready) | 00(X) | 00(none) |

It was assumed in the above that a cache miss occurs in the instruction stream 1; and exchange of instruction stream along with the cache as well as state transition of the instruction streams have been described. The same will also be caused by a cache miss in the LOAD instruction from instructions streams other than the instruction stream 1. As another example, exchange of instruction streams and state transition caused by a cache miss found in the LOAD instruction from the instruction stream 2 will be briefly summarized below.

1) a cache miss in the stream 2
   state of the stream 2: execute state→wait state
2) exchange of instruction streams
   state of the stream 4: ready state→execute state
3) assignment of the register file_Y 108 to the stream
   state of the stream 1: remains at ready state
4) a cache miss found in the stream 3
   state of the stream 3: execute state→wait state
5) update data in the cache memory
   state of the stream 2: wait state→ready state
6) external fetch
   state of the stream 1: ready state→execute state It has been assumed that context of the instruction stream 3 is saved when a cache miss occurs in the LOAD instruction therefrom; however, it can be assumed that the current state thereof is its initial state; that is no execution had been conducted before. In this case execution of the stream 3 will start from a first instruction by giving an address thereof to the FC of the instruction fetch unit assigned to the stream 3.

The number of the register files, the instruction buffers, the instruction decode units, and the execution units may be replaced with others.

Re-execution of the LOAD instruction may start from the fetch unit or the decode unit. In the former case, the context back up memory holds only counting value at the PC; while in the latter case it holds the instruction to be re-executed. The context comprising counting value at the PC, operation code, and memory access has been employed in order to avoid any exceptional accident in execution of the LOAD instruction; therefore, it is merely for convenience of description and will not limit the present invention.

A store instruction may be executed by the load/store execution unit, though a LOAD instruction is executed thereby in the above.

Re-execution of the LOAD instruction may precede update operation of the state control table. Similarly, operation order described in the above should be considered just as an example.

A branch instruction may be executed by the processor, though detailed description thereof is not related to what is disclosed in the present invention and is not provided.

An event other than the cache miss may cause an exchange of the instruction stream. In this case an event causing the interlock may be employed. Further, the cache miss may be generated by a timer which performs a time-out at a certain interval; thereby the exchange operation will be conducted at the predetermined interval.

The event may be a memory access exception, a bus error, or a memory error.

The memory access exception occurs when accessing data in the prohibited data field. Two examples of the memory access exception will be described. 1) It is assumed that the memory is divided into a supervisor field and a user filed, the supervisor field only accessed by the instruction in supervisor mode while the user field possibly accessed by the instruction in supervisor mode or user mode. In this case, data access in the supervisor field by the instruction in user mode will cause the memory access exception. This memory access also violates the access privilege provided to the instruction in supervisor mode. 2) It is assumed that the memory comprises the instruction memory and the data memory, the instruction memory holding programs while the data memory holding data. In this case, fetch of instruction from the data memory or data access (memory access except the fetch) from the instruction memory will be the memory access exception.

The bus error is a failure of obtainment of system bus use. For example, it is assumed that the system bus has been occupied by DMA. In this case the instruction of memory access to the external memory or the I/o device via the system bus will not be completed until the system bus becomes empty. Thus, instruction of the memory access resulting in failure of system bus obtainment will cause the bus error.

The memory error occurs in the memory access. For example, memory access to the address holding no memory will be the memory error. The memory parity error also causes an example of the memory error.

Store of the context into the backup memory may follow the exchange operation rather than preceding it.

The context of the instruction stream in wait state may be stored into an external memory, although in the above it is stored into the context backup memory accommodated inside the processor.

The context backup memory may not be employed. In this case transfer of data between the register file and the context backup memory will not be conducted, and the exchange operation will be conducted among the register files; otherwise an external memory may replace the context backup memory.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A multistream instruction processor issuing instruction from N instruction streams in parallel, and processing instruction streams interchangeably when the number of the instruction streams is N and larger than N, the processor comprising:

an instruction preparation unit comprised of thread slots each of which fetches and decodes instructions from the instruction stream assigned thereto as well as issues a decoding result one at a time, the number of the thread slots being N;

a functional unit comprised of instruction execution means each of which executes the instructions in accordance with the decoding result of the thread slot, the number of the instruction execution means being M, the functional unit including at least one delayable execution means;

an execution connection unit for directing connections between the instruction preparation unit and the functional unit so that the decoding result received from the thread slot will be provided to the instruction execution means which is ready to execute it; and an instruction stream controller comprised of an event detector, a context backup memory, and an exchange controller, the event detector detecting an execution delay in the delayable execution means that was caused by a delaying instruction in an instruction stream;

the context backup memory holding a context of the instruction stream which indicates how far execution of the instruction stream had been conducted prior to the execution delay, the context including thread slot context information indicating an operation state of the thread slot assigned to the instruction stream and execution means context information indicating an operation state of the delayable execution means so that the instruction stream may later be returned to a thread slot and the delaying instruction may be immediately re-executed in the delayable execution means; and the exchange controller performing the following functions when the event detector detects an execution delay caused by a delaying instruction in a first instruction stream, extracting the context of the first instruction stream, including the first instruction stream's thread slot context information and execution means context information, and temporarily storing it into the context backup memory, putting a second instruction stream into the thread slot that was assigned to the first instruction stream by using the second instruction stream's thread slot context information, and making the delayable execution means directly receive and immediately execute the second instruction stream's delaying instruction by using the second instruction stream's execution means context information if the second instruction stream is a previously executing instruction stream that included a delaying instruction that caused an execution delay in the delayable execution means but is now ready for immediate execution therein.

2. the multistream instruction processor of claim 1 wherein the M execution means include a first execution means for mainly executing a load/store instruction, a second instruction execution means for mainly executing an integer arithmetic instruction, a third instruction execution means for mainly executing a floating-point add instruction, and a fourth instruction execution means for mainly executing a floating-point multiply instruction;

the execution connection unit operates so that each of the instructions is assigned to one of the first through the fourth instruction execution means depending on the sort of the instruction; and the predetermined event is a cache miss which happens in execution of an instruction directed to the load/store execution means.

3. The multistream instruction processor of claim 1, wherein
(1) each of the thread slots comprises
   (a) a fetch means for fetching an instruction,
   (b) an instruction decode means for decoding the fetched instruction and issuing an operation and an operand, the operation representing the sort of instruction, and
   (c) a decoder program counter for holding an instruction address of the instruction which is being decoded and for simultaneously issuing the instruction address when the operation and the operand are issued by the instruction decode means,
(2) each of the instruction execution means comprises
   (a) an operation register for holding the operation,
   (b) an operand register for holding the operand, and
   (c) an execution program counter for holding the instruction address received from the decoder program counter, and
(3) the execution connection unit comprises
   (a) an operation switch for assigning the operation to the operation register,
   (b) an instruction address switch for assigning the instruction address received from the decoder program counter to the execution program counter, and
   (c) an operand switch that is controlled by the operand issued from the instruction decode unit.

4. The multistream instruction processor of claim 3, wherein the thread slot context information indicating the operation state of the thread slot includes the information held by the decoder program counter of the thread slot.

5. The multistream instruction processor of claim 3, wherein the execution means context information indicating the operation state of the delayable execution means includes the information held by the execution program counter of the delayable execution means.

6. The multistream instruction processor of claim 3, wherein the execution means context information indicating the operation state of the delayable execution means includes the operation stored in the operation register of the delayable execution means and the operand stored in the operand register of the delayable execution means.

7. A multistream instruction processor issuing instructions from N instruction streams in parallel, and processing instruction streams interchangeably when the number of instruction streams is N and larger than N, the processor comprising:

an instruction preparation unit comprised of thread slots each of which fetches and decodes instructions from the instruction stream assigned thereto as well as issues decoding result one at a time, the number of the thread slots being N;

a functional unit comprised of instruction execution means each of which executes instructions in accordance with the decoding result of the thread slot, the number of the instruction execution means being M, the functional unit including a delayable execution means;

a register unit comprised of register files that each include a plurality of registers for holding data used to execute instructions from an instruction stream assigned to the register file, the number of the register files being L (L≧N);

an execution connection unit for directing connections between the instruction preparation unit and the functional unit so that the decoding result received from the thread slot will be provided to the execution means which is ready to execute it; and an instruction stream controller comprised of an instruction stream control table, an event detector, a context backup memory, and an exchange controller, the instruction stream control table for holding assignment information indicating which thread slot and which register file are assigned to each of the instruction streams, the event detector detecting an execution delay in the delayable execution means that was caused by a delaying instruction in an instruction stream;

the context backup memory holding a context of the instruction stream which indicates how far execution of the instruction stream had been conducted prior to the execution delay, the context including thread slot context information indicating an operation state of the thread slot assigned to the instruction stream and execution means context information indicating an operation state of the delayable execution means so that the instruction stream may later be returned to a thread slot and the delaying instruction may be immediately re-executed in the delayable execution means; and the exchange controller performing the following functions when the event detector detects an execution delay caused by a delaying instruction in a first instruction stream, extracting the context of the first instruction stream, including the first instruction stream's thread slot context information and execution means context information, and temporarily storing it into the context backup memory, putting a second instruction stream into the thread slot that was assigned to the first instruction stream by using the second instruction stream's thread slot context information, and making the delayable execution means directly receive and immediately execute the second instruction stream's delaying instruction by using the second instruction stream's execution means context information if the second instruction stream is a previously executing instruction stream that included a delaying instruction that caused an execution delay in the delayable execution means but is now ready for immediate execution therein.

8. The multistream instruction processor of claim 7, wherein (1) each of the thread slots comprises
   (a) a fetch means for fetching an instruction,
   (b) an instruction decode means for decoding the fetched instruction and issuing an operation and an operand, the operation representing the sort of instruction, and
   (c) a decoder program counter for holding an instruction address of the instruction which is being decoded and for simultaneously issuing the instruction address when the operation and the operand are issued by the instruction decode means,
(2) each of the instruction execution means comprises
   (a) an operation register for holding the operation,
   (b) an operand register for holding the operand, and
   (c) an execution program counter for holding the instruction address received from the decoder program counter, and
(3) the execution connection unit comprises (a) an operation switch for assigning the operation to the operation register, (b) an instruction address switch for assigning the instruction address received from the decoder program counter to the execution program counter, and (c) an operand switch that is controlled by the operand issued from the instruction decode unit.

9. The multistream instruction processor of claim 8, wherein the thread slot context information indicating the operation state of the thread slot includes the information held by the decoder program counter of the thread slot.

10. The multistream instruction processor of claim 8, wherein the execution means context information indicating the operation state of the delayable execution means includes the information held by the execution program counter of the delayable execution means.

11. The multistream instruction processor of claim 8, wherein the execution means context information indicating the operation state of the delayable execution means includes the operation stored in the operation register of the delayable execution means and the operand stored in the operand register of the delayable execution means.

12. The multistream instruction processor of claim 7 wherein the number of register files L is larger than the number of thread slots N by 1.

13. The multistream instruction processor of claim 12, wherein the instruction stream control table holds assignment information to indicate which N of the L register files are assigned to instruction streams that are assigned to the N thread slots and which one register file is assigned to an instruction stream that is not assigned to a thread slot; and the exchange controller transfers a part of the context of the instruction stream that is not assigned to a thread slot into the one register file before switching instruction streams.

14. The multistream processor of claim 13, wherein the delayable execution means is a load/store execution means, the delaying instruction is a load/store instruction, and the event detector detects an occurrence of a cache miss caused by the load/store instruction and a resolution of the cache miss and wherein the exchange controller comprises:

first search means for referencing the instruction stream control table to detect the instruction stream that contains the load/store instruction that caused the cache miss, the thread slot that is being used by the detected instruction stream, and the register file that is assigned to the detected instruction stream;

instruction issue stop means for terminating the detected thread slot so that no further instructions will be issued thereby;

context transfer means for, after operation of the instruction issue stop means, transferring the first instruction stream's context to the context backup memory from the load/store execution means, the detected thread slot, and the detected register file and then transferring a part of another instruction stream's context from the context backup memory to the register file;

second search means for referencing the instruction stream control table to detect the other instruction stream that was previously terminated by the instruction issue stop means for assignment to the detected thread slot; and instruction re-execution means for having the context transfer means load the context of the other instruction stream that was detected by the second search means from the context backup memory into the load/store execution means and the detected thread slot, and restarting the detected thread slot to issue instructions from the other instruction stream to which it is now assigned.

* * * * *